7882X
T. P. Anderson,
Water-Wheel Gate.
Patented Dec. 23, 1833.
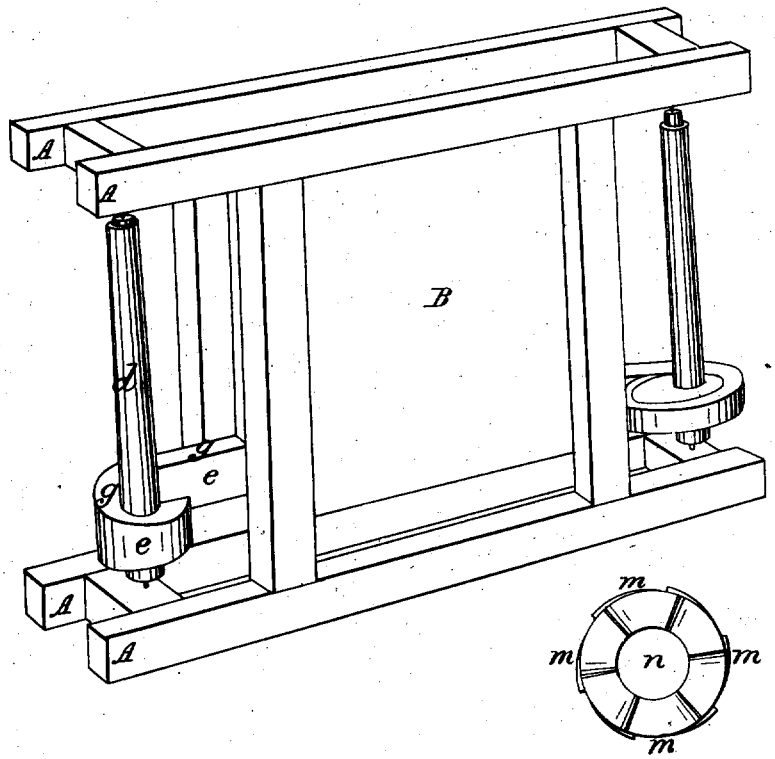
N. PETERS, PHOTO-LITHOGRAPHER, WASHINGTON, D. C.

7882x

Dec 23, 1833 171

Timothy P. Anderson of Hardwick, county of Worcester commonwealth of Massachusetts Letters Patent The Schedule referred to in these Letters Patent and making part of the same, containing a description in the words of the said Timothy P. Anderson himself of his improvement in the economy of Water power by means of a graduated spout.

To all people to whom these Presents shall come

Be it Known, that I Timothy P. Anderson of Hardwick in the county of Worcester and commonwealth of Massachusetts, Machinist have invented a new and useful improvement in the economy of water power by means of a graduated spout or trough, and that the following is a full and exact description of the construction & operation of the same as invented or improved by me & specified in the words following. To Wit The flume containing the water may be construc-ted in the usual manner. The shaft of the water wheel stands per-pendicularly & near the lower end of it, are firmly attached the buck-ets. The buckets which I have made use of, are about twelve inch in width and placed upon the shaft in this way: they lap over each other at the ends and the space between the laps is about two inches The spout conducting the water from the flume is as wide as the buckets and passes round the shaft in such manner that the upper side of the buckets compose the lower side of the spout. From the point at which the water strikes the first bucket, the spout begins to diminish in its depth (its width being uniform) until it has passed entirely round the wheel. The top and sides of the spout are made sufficiently firm to support the pressure of the water. The only place for the water to escape from the spout is thro' its laps in the buckets. And as the spout diminishes in its depth the pressure of the water [illegible] is as great on the last as on the first bucket & is upon all the buckets at the same time

62

7882x Dec 23, 1833

Explanation of the Drawing

AAAA Frame of the Flume B c Flume d shaft e e spout, conducting the water to the wheel gg Top or upperside of the wheel, n shaft - m m m Buckets attached to the shaft & contained in the spout e e - Operation of the Machine — When the water is permitted to pass out of the flume into the spout e e the whole spout is immediately filled and the pressure of the water upon the buckets puts the shaft in motion There is a resemblance at first sight between my wheel and a common tub wheel, but the difference consists in the manner in which the water leaves the buckets - In the tub wheel the water leaves the buckets at almost a right angle, but in mine it leaves them in almost directly the opposite direction to its course - And in this way as the water flows in a direction nearly opposite parallel with the Buckets and cannot escape, excepting between them, the first action of the water is direct impulse and that produced by the contrary direction is reaction, and these, it is believed make a valuable saving of Water power -

All I claim as my invention is the graduated spout or trough as above described & its applicability as applied by me —

Witnesses
John B Davis
Lewis Bigelow

Timothy P. Anderson

Drawing

[illegible]

650 [illegible]